A. BARDELL & S. SMITH,
Assignors, by mesne assignments, to F. HABERMAN and E. KETCHAM & Co.
COAL SCUTTLE.
No. 9,968. Reissued Dec. 13, 1881.
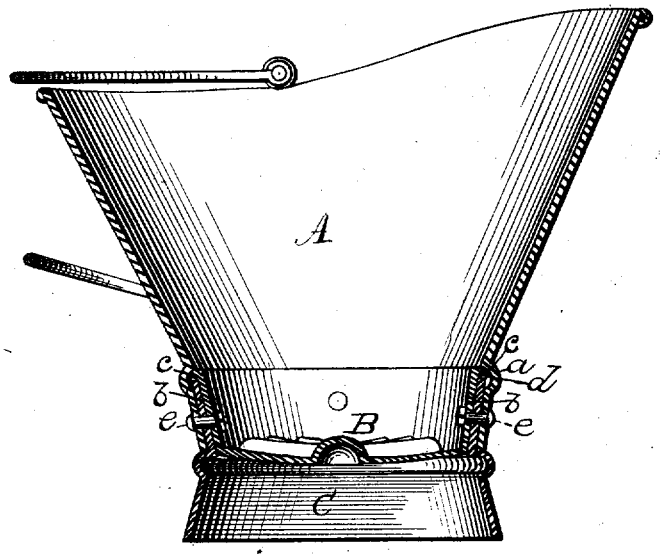
Witnesses:
James H. Hunter.
Elwyn. S. Walker.
Inventors:
Alfred Bardell
Samuel Smith
N. PETERS, Photo-Lithographer, Washington, D. C.

UNITED STATES PATENT OFFICE.

ALFRED BARDELL AND SAMUEL SMITH, OF BROOKLYN, ASSIGNORS, BY MESNE ASSIGNMENTS, TO FREDERICK HABERMAN AND E. KETCHAM & CO., OF NEW YORK, N. Y.

COAL-SCUTTLE.

SPECIFICATION forming part of Reissued Letters Patent No. 9,963, dated December 13, 1881.

Original No. 62,807, dated March 12, 1867. Reissue No. 3,438, dated May 18, 1869. Application for reissue filed February 17, 1881.

*To all whom it may concern:*

Be it known that we, ALFRED BARDELL and SAMUEL SMITH, both of the city of Brooklyn, county of Kings, and State of New York, late of the city of New York, in said State, have invented a new and useful Improvement in Coal-Scuttles; and we do hereby declare the following to be a full, clear, and exact description thereof, reference being had to the drawing accompanying this specification and forming part thereof.

Our improvement consists in bringing three thicknesses of metal just above the level of the bottom and around the lower portion of the body of the coal-scuttle, so as to re-enforce the sheet-metal body at this point in the ordinary sheet-iron scuttle.

Coal-scuttles of ordinary construction wear out quite rapidly at the sides, near the bottom of the body, such wear being occasioned by the friction which the lumps or particles of coal produce in that part of the scuttle, also by the moisture which so frequently accumulates in the coal.

The drawing illustrates one way in which our improvement may be practiced.

The figure is a vertical central section of a coal-scuttle containing our improvements.

A is the body of the scuttle, having made upon the lower portion, within a short distance of the edge that comes in contact with the base-rim, a bead, *a*, which runs the whole distance around the body.

B is a sheet-iron bottom, which is struck up so as to form a rim, *b*. Upon this rim is formed a small continuous flange, *c*. When the bottom B is placed within the body A this flange takes into the recess *d* of the bead *a*.

The body A from the bead down is made a little flaring, and the portion of the bottom (rim *b*) from which the flange *c* projects is at a little inclination inward to the bottom proper, so as to permit of a small space existing between the body and bottom, in which is retained the base-rim C, running completely up to the flange *c* of the bottom. This construction of three thicknesses of sheet metal is at the part where it is most needed—namely, just above the level of the bottom B and around the lower portion of the body A—while the weight of the scuttle is not thereby increased.

The body, bottom, and base-rim can be secured together by means of screws or rivets, as shown at *e e e e*.

The bringing of three thicknesses above the level of the bottom and around the lower portion of the body also enables the manufacturer to construct the scuttle in three removable parts. Any one of these parts may be easily replaced if it should be required from any cause.

We do not claim, broadly, the bringing of three thicknesses of metal together, such as shown in the Letters Patent granted to Edward Horalek, April 9, 1861, for improvement in boilers for hot-water apparatus, numbered 31,976; but What we do claim, and desire to secure by Letters Patent, is—

A coal-scuttle in which there are three thicknesses of metal at that portion which is just above the level of the bottom and around the lower portion of the body, consisting of the flange of the bottom, the lower portion of the body A, and the upper portion of the rim C, substantially as described.

ALFRED BARDELL.
SAMUEL SMITH.

Witnesses:
K. NEWELL,
JAMES H. HUNTER.